E. L. NERO.
TEMPLE MEASURING DEVICE.
APPLICATION FILED MAR. 24, 1910.
987,315.
Patented Mar. 21, 1911.
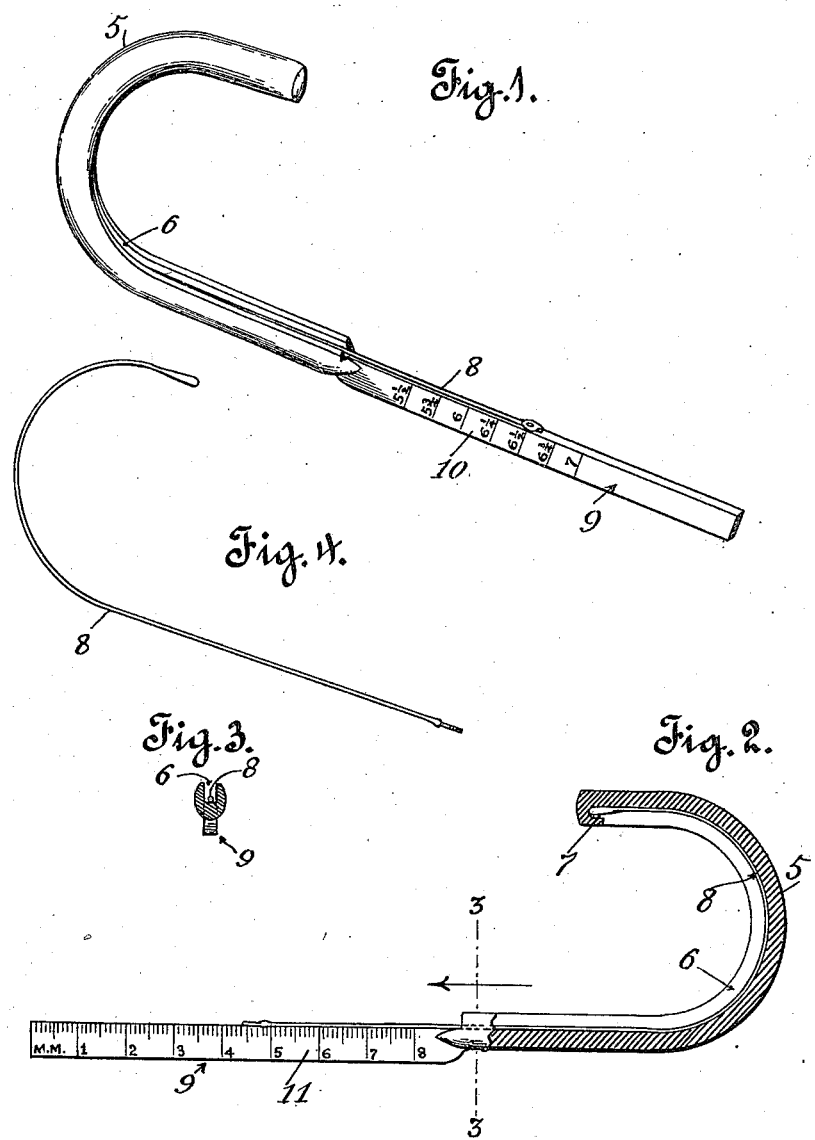

UNITED STATES PATENT OFFICE.

ELIZABETH LEE NERO, OF SAN FRANCISCO, CALIFORNIA, ASSIGNOR OF ONE-HALF TO CHARLES E. GLAFKE, OF SAN FRANCISCO, CALIFORNIA.

TEMPLE-MEASURING DEVICE.

987,315. Specification of Letters Patent. Patented Mar. 21, 1911.

Application filed March 24, 1910. Serial No. 551,247.

*To all whom it may concern:*

Be it known that I, ELIZABETH LEE NERO, a citizen of the United States, residing in the city and county of San Francisco, State of California, have invented new and useful Improvements in Temple-Measuring Devices, of which the following is a specification.

My invention relates to devices for measuring the temple pieces of spectacles and the object thereof is to provide a simple and efficient device by the use of which the length of a temple piece may be correctly ascertained without straightening it out and measuring it on a rule. I accomplish this object by the device described herein and illustrated in the accompanying drawings in which, Figure 1 is a perspective view of my improved measuring device, with the temple piece inserted therein. Fig. 2 is a central section of the bow end of the device and a side elevation of the remaining portion of the device taken from the side opposite of Fig. 1, with a temple piece in place therein. Fig. 3 is a section on the line 3—3 of Fig. 2. Fig. 4 is a side elevation of a temple piece.

In the drawings 5 is the crook or head of my measuring device preferably provided with a groove 6, which groove is preferably on the inner side thereof. The outer end of this groove preferably terminates in a pocket 7 in which is received the outer end of the temple piece 8 when my device is used for measuring the same, as best illustrated in Fig. 2. If desired the groove could be in the side of the device, but it is more convenient for use when the groove is in the inner side of the head; or the groove could be omitted. The body 9 is provided with a scale 10 on one side thereof, which scale is provided with the usual marks which designate the ordinary lengths of temple pieces. On the opposite side of the body may be placed a millimeter scale 11 for measuring pupilary distances.

In the use of my device we will assume that a user has broken one of the temple pieces of his spectacles and desires to have a new one in place of it. He goes to an optician equipped with my improved measuring device, who takes the uninjured temple piece and places the outer end thereof in the pocket in the head of the measuring device and forces the crook into the groove in the head and brings the remaining portion into contact with the body. The end of the temple piece will then come opposite one of the figures of the scale as shown in Fig. 1, which will immediately show to the optician the required length of temple piece to be used in replacing the broken one. He then goes to his supply depot and selects the temple piece of the required length and puts it into the frame. By this means he has quickly and accurately ascertained the proper length of temple piece, without in any manner affecting the other temple piece, as must be done without the use of my improved measuring device.

Having described my invention what I claim is;

1. A temple piece measuring device comprising a non-sectional body piece provided with a scale on one side thereof, and having a curved head, said head having a stop against which the outer end of the bow abuts when being measured.

2. A temple piece measuring device comprising a body piece provided with a scale on one side thereof, and having a curved head containing a groove, said groove terminating in a pocket at the outer end thereof.

3. A temple piece measuring device comprising a crook having a groove in the inner side of the head thereof terminating in a pocket in the outer end of the groove and a scale on the body, said scale being so placed as to determine the usual length of a temple piece.

In witness that I claim the foregoing I have hereunto subscribed my name this 16th day of March, 1910.

ELIZABETH LEE NERO.

Witnesses:
CHARLES E. GLAFKE,
ANNE F. HASTY.

Copies of this patent may be obtained for five cents each, by addressing the "Commissioner of Patents, Washington, D. C."